US009278764B2

(12) United States Patent
Ordonez et al.

(10) Patent No.: US 9,278,764 B2
(45) Date of Patent: Mar. 8, 2016

(54) THREE-PIECE AIRCRAFT BRAKE ASSEMBLY CONTAINER AND METHOD OF USING SAME

(71) Applicants: Jose Ordonez, Canyon Country, CA (US); Neil Waldron, Valencia, CA (US)

(72) Inventors: Jose Ordonez, Canyon Country, CA (US); Neil Waldron, Valencia, CA (US)

(73) Assignee: Bill Thomas Associates, Inc., Valencia, CA (US)

( * ) Notice: Subject to any disclaimer, the term of this patent is extended or adjusted under 35 U.S.C. 154(b) by 0 days.

(21) Appl. No.: 13/756,534

(22) Filed: Feb. 1, 2013

(65) Prior Publication Data

US 2014/0054188 A1   Feb. 27, 2014

Related U.S. Application Data

(60) Provisional application No. 61/691,978, filed on Aug. 22, 2012.

(51) Int. Cl.
*B65D 85/68* (2006.01)
*B64F 5/00* (2006.01)

(52) U.S. Cl.
CPC .......... *B64F 5/0036* (2013.01); *B64F 5/0081* (2013.01); *Y10T 29/49826* (2015.01)

(58) Field of Classification Search
CPC .. B64F 5/0036; B64F 5/0081; F16D 65/0043; B65D 85/68; B65D 2585/6882; B65D 11/1833; B65D 19/02; B65D 2519/00273; B65D 2519/00323; B65D 2519/00333; B65D 2519/00338; B65D 2519/00348; B65D 2519/00497; B65D 2519/00502; B65D 2519/00611; B65D 2519/00656; B65D 2519/00791; B65D 2519/00805; B65D 2519/009; B65D 2519/00995; Y10T 29/49826
USPC .............. 206/335, 319, 408, 303, 304, 304.1, 206/404, 445, 446, 468, 191, 758, 317, 3, 206/598; 220/4.22–4.24, 1.5; 29/248
See application file for complete search history.

(56) References Cited

U.S. PATENT DOCUMENTS

| | | | |
|---|---|---|---|
| 2,613,807 A | 10/1952 | Higbee | |
| 2,708,509 A | 5/1955 | Gould et al. | |
| 2,728,581 A | 12/1955 | Goebert et al. | |
| 2,858,014 A | 10/1958 | Koziol | |
| 2,982,395 A * | 5/1961 | Rados | 206/319 |
| 3,198,418 A | 8/1965 | Rupp | |
| 3,762,600 A | 10/1973 | Kreutzweiser | |
| 3,789,960 A * | 2/1974 | Warren | 188/74 |
| 3,982,651 A | 9/1976 | Braun et al. | |
| 4,027,794 A | 6/1977 | Olson | |
| 4,033,454 A | 7/1977 | Santoni | |

(Continued)

FOREIGN PATENT DOCUMENTS

DE    4136268 A1    5/1993

*Primary Examiner* — Anthony Stashick
*Assistant Examiner* — James M Van Buskirk
(74) *Attorney, Agent, or Firm* — Tangent Law Group, PLLC; Eric J. Weierstall, esq.

(57) ABSTRACT

An aircraft brake assembly container having a base or container portion with feet extending therefrom. A further base portion is provided and mounted atop the base portion. A spacing is provided between the base and further base portions and this spacing is filled by a spacing container portion or member. The spacing container portion allows for lower profile base and further base portions while accommodating larger diameter new and used brake assemblies. A method of using same is also provided.

8 Claims, 14 Drawing Sheets

(56) References Cited

U.S. PATENT DOCUMENTS

| | | | |
|---|---|---|---|
| 4,034,926 A | 7/1977 | Wegner | |
| 4,109,790 A | 8/1978 | Gottschlich | |
| 4,139,093 A | 2/1979 | Holmes | |
| 4,151,914 A | 5/1979 | Blatt | |
| 4,305,508 A | 12/1981 | Rodgers | |
| 4,412,615 A | 11/1983 | Forshee | |
| 4,597,461 A * | 7/1986 | Kochy et al. | 180/90 |
| 4,735,310 A | 4/1988 | Lemery et al. | |
| 4,765,500 A * | 8/1988 | Ingram | 220/4.24 |
| 4,790,430 A | 12/1988 | Thomas | |
| 4,893,713 A * | 1/1990 | Thomas | 206/304 |
| 4,901,855 A | 2/1990 | Furukawa | |
| 4,993,623 A * | 2/1991 | Kelly et al. | 229/122.29 |
| 5,048,679 A | 9/1991 | Thomas | |
| 5,104,054 A | 4/1992 | Latham | |
| 5,114,037 A * | 5/1992 | Hillis et al. | 220/4.03 |
| 5,127,520 A | 7/1992 | Thomas | |
| 5,215,184 A * | 6/1993 | Huber | 198/782 |
| 5,265,749 A | 11/1993 | Zutler | |
| 5,289,935 A * | 3/1994 | Hillis et al. | 220/4.03 |
| 5,388,714 A | 2/1995 | Zutler | |
| 5,513,940 A * | 5/1996 | Florentin et al. | 414/458 |
| 5,769,260 A | 6/1998 | Killinger | |
| 5,850,921 A | 12/1998 | Shindou | |
| 6,036,007 A | 3/2000 | Alejandro | |
| 6,184,507 B1 | 2/2001 | Kouno et al. | |
| 6,315,122 B1 | 11/2001 | McCord | |
| 6,474,473 B2 | 11/2002 | Wong | |
| 6,675,723 B2 * | 1/2004 | Sukeva | 108/55.1 |
| 7,690,506 B2 | 4/2010 | Ordonez et al. | |
| 7,954,220 B2 | 6/2011 | Ordonez et al. | |
| 8,413,833 B1 * | 4/2013 | Taylor et al. | 220/315 |
| 2007/0261979 A1 * | 11/2007 | Ordonez et al. | 206/408 |
| 2010/0122921 A1 * | 5/2010 | Fiore | 206/303 |
| 2010/0122922 A1 * | 5/2010 | Fiore | 206/303 |

* cited by examiner

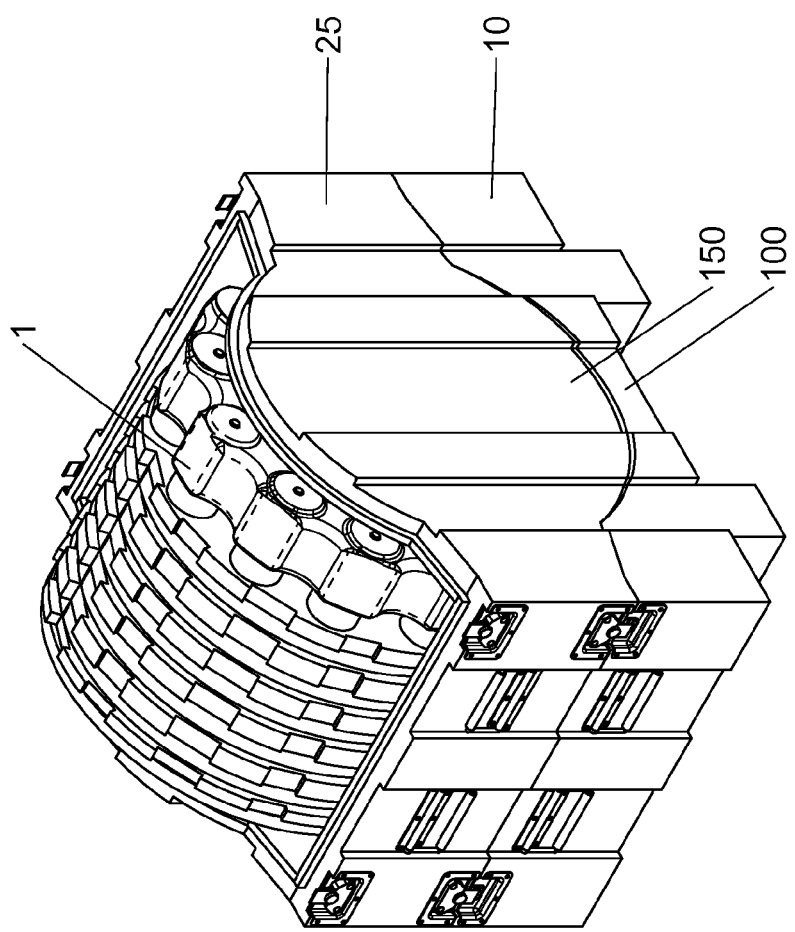
FIG. 3A1

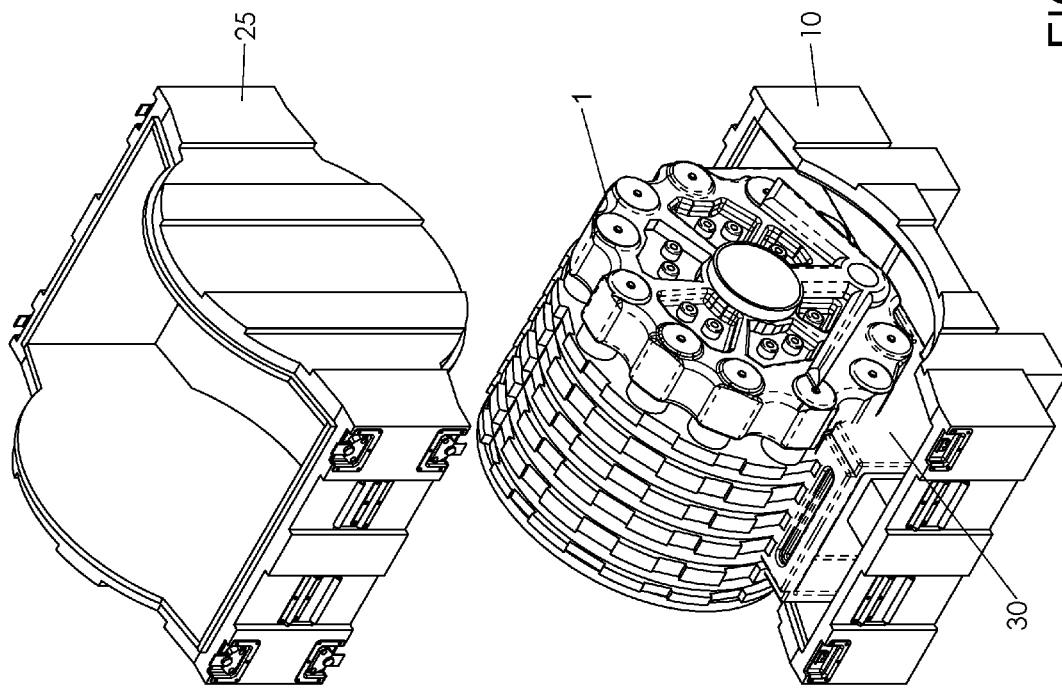
FIG. 3A2

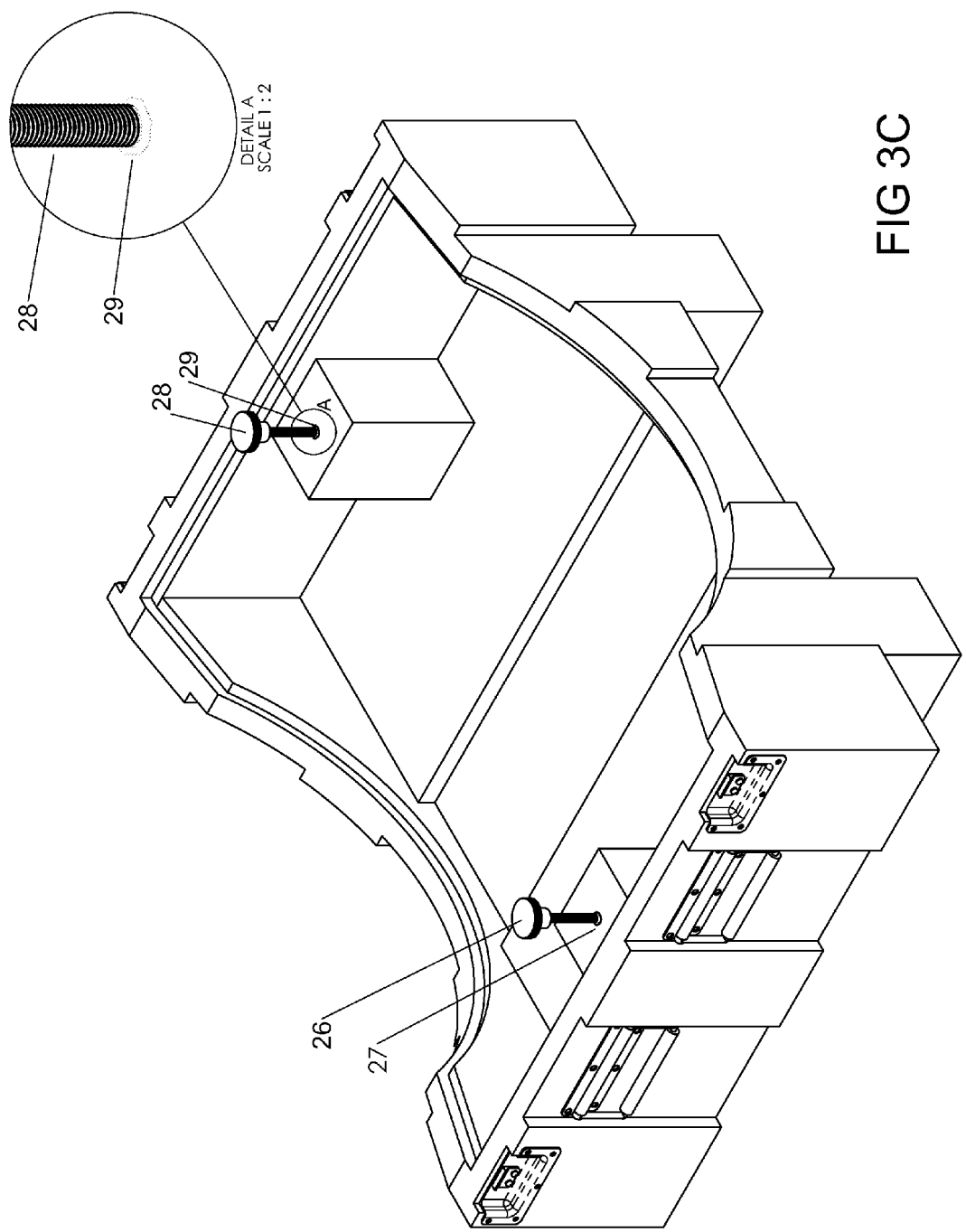

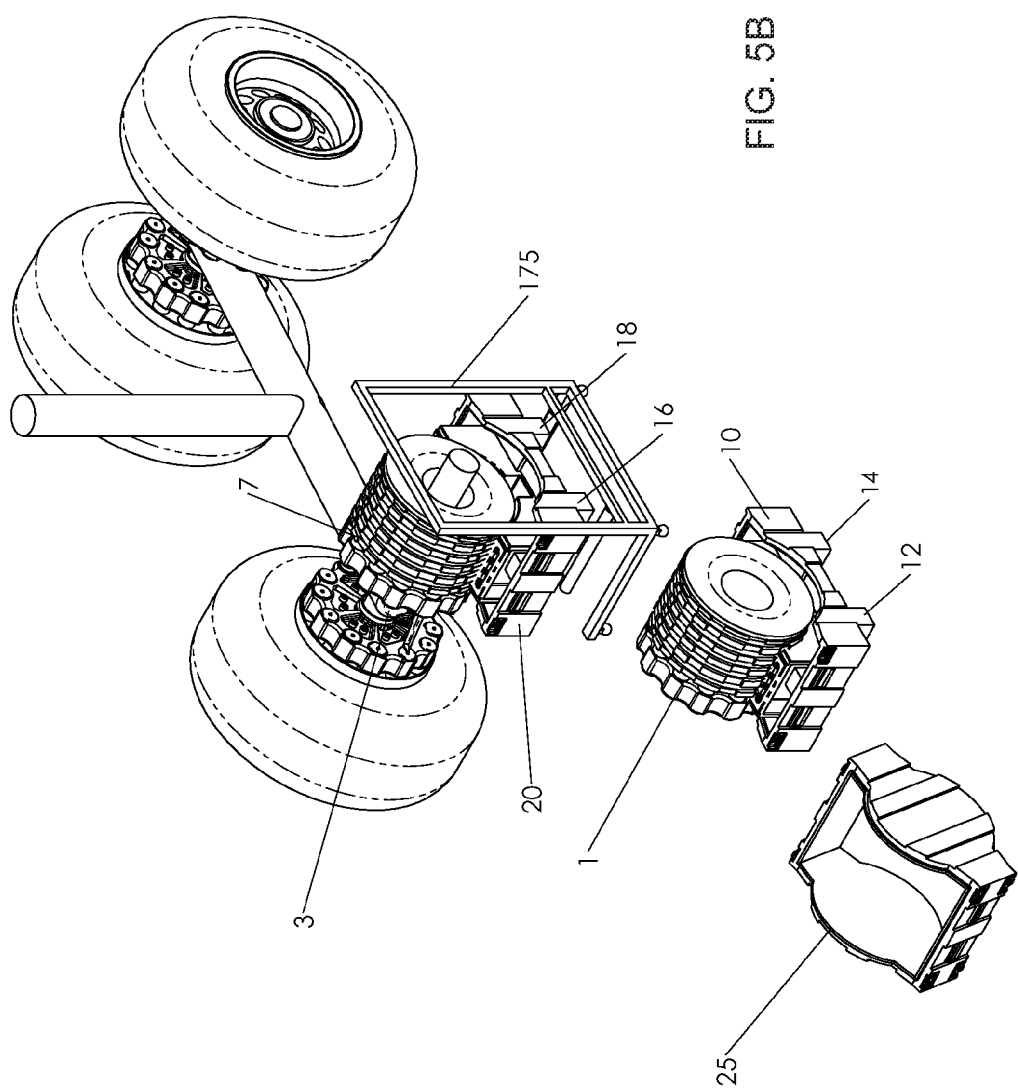

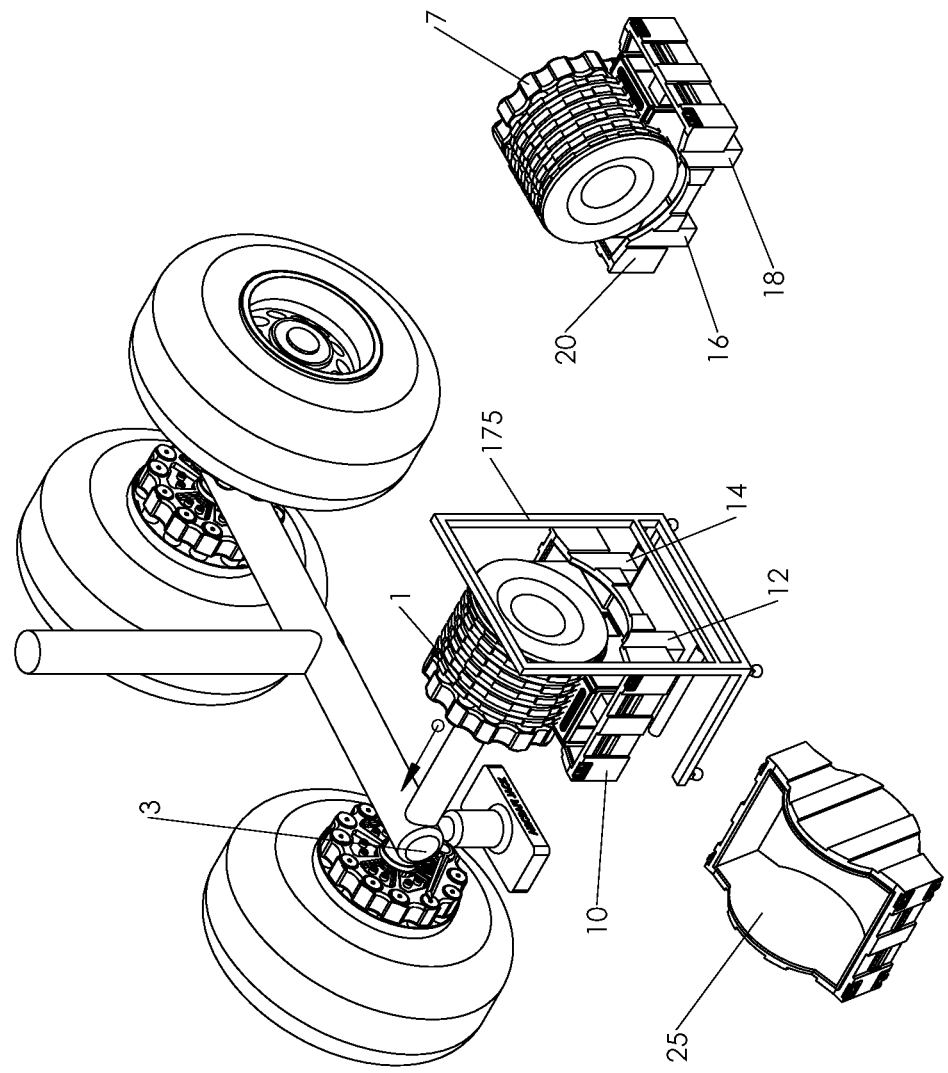

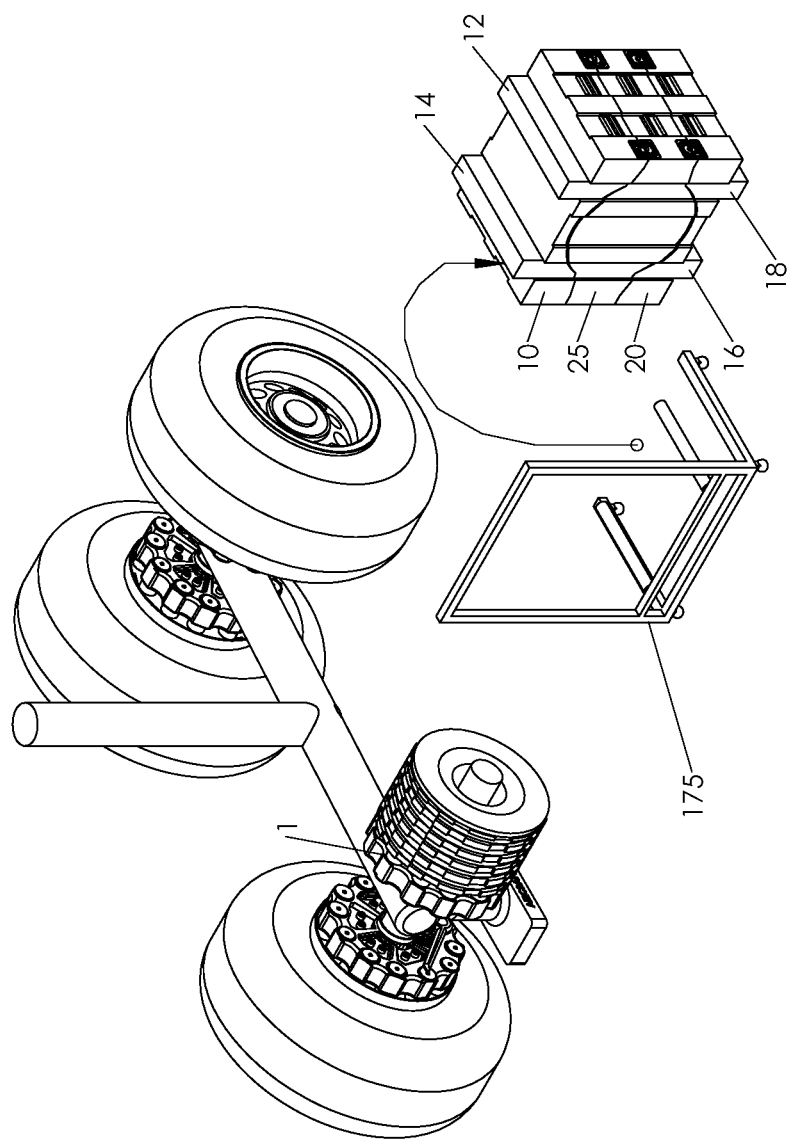

THREE-PIECE AIRCRAFT BRAKE ASSEMBLY CONTAINER AND METHOD OF USING SAME

CROSS-REFERENCE TO RELATED APPLICATIONS

This application claims the priority of U.S. provisional patent application 61/691,978, filed Aug. 22, 2012, which is incorporated herein by reference.

BACKGROUND OF THE INVENTION

1. Field of the Invention

The invention relates to an aircraft brake assembly container, more specifically an aircraft brake assembly container having a variable internal geometry and a method of using the container in securing aircraft brake assemblies, more specifically a method of integrating the container in the method of securing the new and used aircraft brake assemblies with provision for a spacing member between two halves of the container.

2. Background of the Invention

A unique difficulty exists in the aircraft industry in that frequent maintenance service is required to maintain serviceable vehicles. Maintenance is one of the principal costs in operating airlines, and, therefore, the airline industry and industries similar to it with vehicle fleets are frequently looking for ways to increase productivity in servicing these fleets. In servicing airplanes, airplane brakes frequently require replacement. This type of service requires disassembly of the existing brake assembly from the undercarriage and removal of the assembly, typically requiring wincing or manhandling of the components due to the heavy weight of the components, and then storage and transport of the used assembly. Similarly, during servicing, the new brake assembly must be loaded, moved, winched, and mounted to the undercarriage of the airplane. The packaging of the brake is, therefore, important in facilitating this service. Several configurations of specialized containers have been conceived in the past to address increased productivity in various activities involving shipping containers.

Further developments in aircraft have led to larger brake assemblies, requiring larger containers and lower profiles to best fit under a used brake assembly do to design changes in the assemblies and the aircraft undercarriages. A need for an oversized container to contain the larger brake assemblies with a lower profile in the section being used in removal and storage of the used brake assembly and installation of the new brake assemblies is needed. In addition, additional transformative aspects of the improved container are needed in the process of using the brake container in replacing an aircraft brake assembly with lower profile requirements due to undercarriage design.

In the search for increased productivity, numerous design improvements in specialized containers have been utilized. Many designs for shipping containers have, in the past, utilized various design elements, for instance mirror image container halves, in attempts to provide for a more convenient container. For instance, U.S. Pat. No. 2,728,581 shows an ammunition transport container with a box structure having two halves each formed of two open-ended sections. Included are rigid cradle-like units 23 as shown in FIG. 2 having a semi-circular seat of a size and shape adapted to accommodate the normally outwardly projecting end of the cylindrical hollow core of the ammunition containers contained in the box. Similarly, several designs have provided containers for cradling delicate materials with inserts for transport. German Patent DE4136268A1 describes a container for transporting and storing wire spools. The container has two halves (1, 21), with two supports guides (3) for supporting the spools and allowing them to be played out with guide bars, as described. In this instance, the structure also facilitates spooling out wire. However, none of these addresses the complexities of aircraft brake assembly servicing and the containers used in this servicing. These designs do not provide for integration of the container as a tool in servicing procedures, much less in servicing aircraft brake assemblies.

Even in the special case of transporting aircraft components, for example, aircraft brake assembly components, there are examples of using specially accommodating containers, such as designs incorporating specially shaped halves. For instance, U.S. Pat. No. 6,036,007, shows a transportation case for heavy objects and provides for accommodating halves, with the top lid and base that are distinct for supporting the brake assembly in a vertical position. The design has two equal portions, a top portion and a mating bottom portion. Additionally, the components are supported by cushions. The bottom portion employs a substantially frusto-conically shaped cushion projecting upwardly therefrom, toward the top portion. The top portion employing a similar frusto-conically shaped cushion projecting downwardly therefrom, toward the bottom portion. The cushions are substantially aligned to hold the brake assembly in a vertical position.

However, no accommodation was made for making the container more useful in the process of servicing the brake assembly. Until Applicants' development of the aircraft brake assembly container of U.S. Pat. No. 7,690,506. Applicants' identified an increase in productivity by utilizing a variable internal geometry container with halves containing the new brake assembly and providing access through one side of the container to the aircraft brake assembly mounting. This allows for the used brake to be slid into one half of the delivered aircraft brake container that is removed from the new brake assembly container after delivery and then use of the remaining half to be slid with the new brake assembly onto the aircraft and installed. This process is outlined in Applicants' U.S. Pat. No. 7,954,220.

However, further developments in aircraft design and increased size of the aircraft disks have led to a need for a lower profile container to move into position under the aircraft undercarriage while still providing a container with sufficient dimensions to contain a larger aircraft brake disc.

As noted in Applicants' previous filings, increased productivity can be achieved through an improved container that facilitates service methods for brake assembly servicing. Specifically, a brake container that facilitates transport of the brake assembly to the aircraft undercarriage and removal of the used brake all on the axle of the aircraft without the need for additional slinging or wincing or manhandling of the assembly on and off the axle. This both improves efficiency and, potentially, reduces injuries from manhandling of brake assemblies during servicing. However, in some models of airplane, a lower profile side of the container with the void space to provide penetration of the aircraft axle is required than that available to accommodate the dimensions of the brake in a final transport position or configuration when the brake container is reassembled. Thus an improved container is necessary. Additionally, this improved container accommodates an even wider variety of brake assemblies, reducing the costs of manufacture of the containers and facilitating easy accommodation of changes in the design and geometry of the brake assemblies.

Furthermore, several models of these types of containers are required to accommodate the several models of brake assembly. This lack of flexibility necessitates use a wide variety of container sizes and shapes that house a particular brake assembly series or are similarly specific to an aircraft component or series of components. The design specific containers add costs for aircraft maintenance companies and require special accommodations by container manufacturers in manufacturing the specific container lines. This results in frequent line changes to produce the wide varieties of different shapes, sizes, and geometries in these containers, thus driving up costs. Similarly, the failure to integrate the container shape to fit into the method of servicing the aircraft brake increases the time required to perform maintenance, further adding costs.

To date, only the existing container design of the Applicant has been supplied that both aids in removal and in the installation of the brake assembly in lower profile applications, provides for the ability to vary internal geometry to accommodate a wide variety of aircraft brake assemblies, and provides for reassembly for container storage and/or transport of the used brake assembly. This has provided for a cost effective aircraft brake assembly container that provides for both durable and stable transport of the brake assembly and ease of use as well as better integration of the container into the maintenance processes of the lower installation profile undercarriage aircraft and provides a container that is also flexible enough to accommodate variations in the size, shape, and geometry of existing aircraft and spacecraft brake assemblies and allows for transport of the brake assembly in a horizontal orientation.

However, a need exists for an even greater flexibility and range in accommodating ever larger brake assemblies and to provide for enhanced, lower clearance at the lip of the container during service procedures, and improved load spreading and support during transport. Thus, further modification of the basic container assembly has resulted in an even greater ability to adapt the existing container and lower the profile of the container as it is used in service.

SUMMARY OF THE INVENTION

An aspect of the invention is to provide a durable and stable transport for a brake assembly and that is easy to use and better integrated into the maintenance processes of the aircraft.

An aspect of the invention is to provide an aircraft brake assembly container with greater versatility and appeal to aircraft maintenance companies.

A further aspect of the invention is to provide for a lower manufacturing cost for manufacturing an aircraft brake assembly container with a lower profile in installation capable of accommodating a wide range sizes, shapes, and geometries in aircraft brake assemblies.

A still further aspect of the invention is to provide a method and a container for use with the method that improves productivity in servicing aircraft that require a lower profile container portion in removal and installation of brake assemblies.

An aspect of the invention is to provide an aircraft brake assembly container that is flexible enough to accommodate variations in the size, shape, and geometry of existing aircraft and spacecraft brake assemblies while providing for both durable and stable transport and ease of use in the maintenance processes of the aircraft having lower profile requirements due to undercarriage design.

Yet another aspect of the invention is to provide a method and a container for use with the method that improves productivity in servicing aircraft brake assemblies lower profile requirements due to undercarriage design.

A further aspect of the invention is to provide a container with at least three parts to better accommodate the aforementioned brake hauling and installation but also having and enhanced load spreading form factor for better and more stable storage and transport of the stacked assemblies in the container and enhanced lifting using lifting devices.

A still further aspect of the invention is to provide a method of brake assembly installation that utilizes a brake assembly container having a variable internal geometry, a horizontal brake assembly orientation, and provides for storage of the used brake assembly in a more efficient manner.

The invention includes an article of manufacture, an apparatus, a method for making the article, and a method for using the article.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations that will be apparent to those skilled in the art.

BRIEF DESCRIPTION OF THE DRAWINGS

Embodiments of the invention are explained in greater detail by way of the drawings, where the same reference numerals refer to the same features.

FIGS. 3A1 and 3A2 show an isometric view of a base portion attached to the spacing member and detached, respectively, in an exemplary embodiment of the instant invention.

FIG. 3C shows an isometric view of a base portion of the exemplary embodiment without cradle member.

FIGS. 5A-5E are isometric views of the exemplary embodiment of the invention as deployed during maintenance operations.

DETAILED DESCRIPTION OF THE INVENTION

Figure 1:
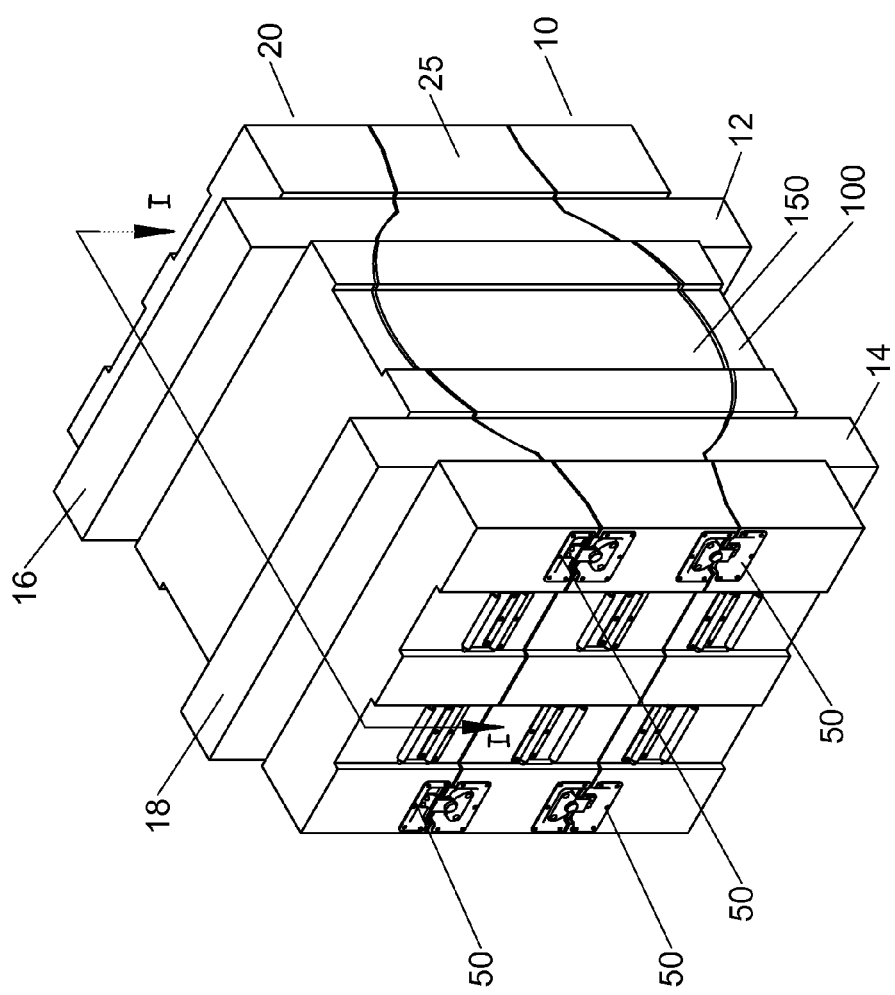
FIG. 1 shows an isometric view of an exemplary embodiment of the instant invention.

FIG. 1 shows an isometric view of an exemplary embodiment of the instant invention. A base or container portion 10, is shown having foot members 12, 14 extending therefrom. A second base portion or second of an at least three container portions 20 is provided and mounted atop a base portion or first of an at least three container portions 10 with a spacing container portion or at least third container portion therebetween.

Figure 5A:
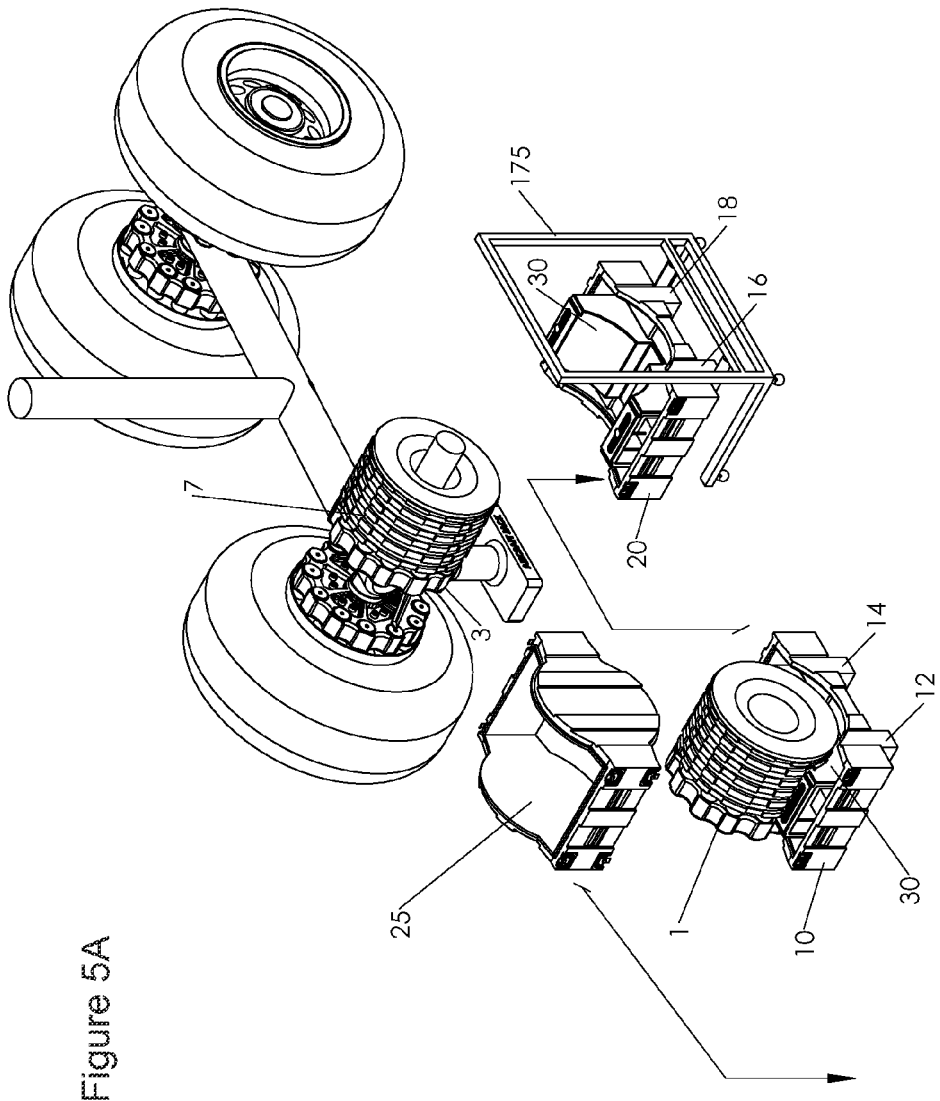

A spacing is provided between the base portions 10, 20 and this spacing is filled by the spacing container portion or member or third container portion 25. Reference is made to and the exemplary embodiment shows a single spacing container portion, however, the spirit of the invention embraces multiple elements or portions combining to provide the necessary spacing container portion and, though not shown, are herein contemplated. The spacing container portion 25 allows for lower profile first base 10 and second base 20 container portions while accommodating larger diameter new and used brake assemblies 1, 7, as best shown in FIG. 5. Base portion 20 has foot members 16, 18. Though reference is made to the two base portions 10, 20 of this exemplary embodiment of the instant invention, further exemplary embodiments of the invention contemplate additional base portions or different configurations of the base portions to suit specific container requirements.

The two base portions 10, 20 are secured to the spacing container portion 25 through an at least two securement devices 50 on each of the base portions 10, 20. The at least two securement devices 50 in the exemplary embodiment shown are provided as several latches spaced about the exterior of the base portions 10, 20, releasably coupling the base portions 10, 20 through the spacing container portion 25. Additional securement devices are contemplated, including but not limited to pins, hinges, and the like providing releasably coupling of the at least one base portion.

An at least one tab portion 150 extends from the spacing container portion 25 and mates with a matching void portion 100 along at least one side of the container portions 10, 20. The matching void portion 100 facilitates entry of the axle of the aircraft undercarriage during maintenance operations. During the aircraft brake servicing; as describe herein below, the base portions 10, 20 are oriented with the axle and the new or used brake assemblies 1, 7, are slid on or off the axle while being cradled by cradle member 30 within the respective base portion 10, 20. In the exemplary embodiment, to facilitate the penetration of the axle, void portion 100 is provided and a tab portion 150 is provided on each of the base portions 10, 20 and respective portions of the spacing container portion 25. With the result being that each of the first and second base portions are identical to one another in the exemplary embodiment. In further embodiments, variations in the shape, number and placement of these tabs is contemplated to further suit the required uses in servicing aircraft components or in further servicing scenarios.

Figure 2:
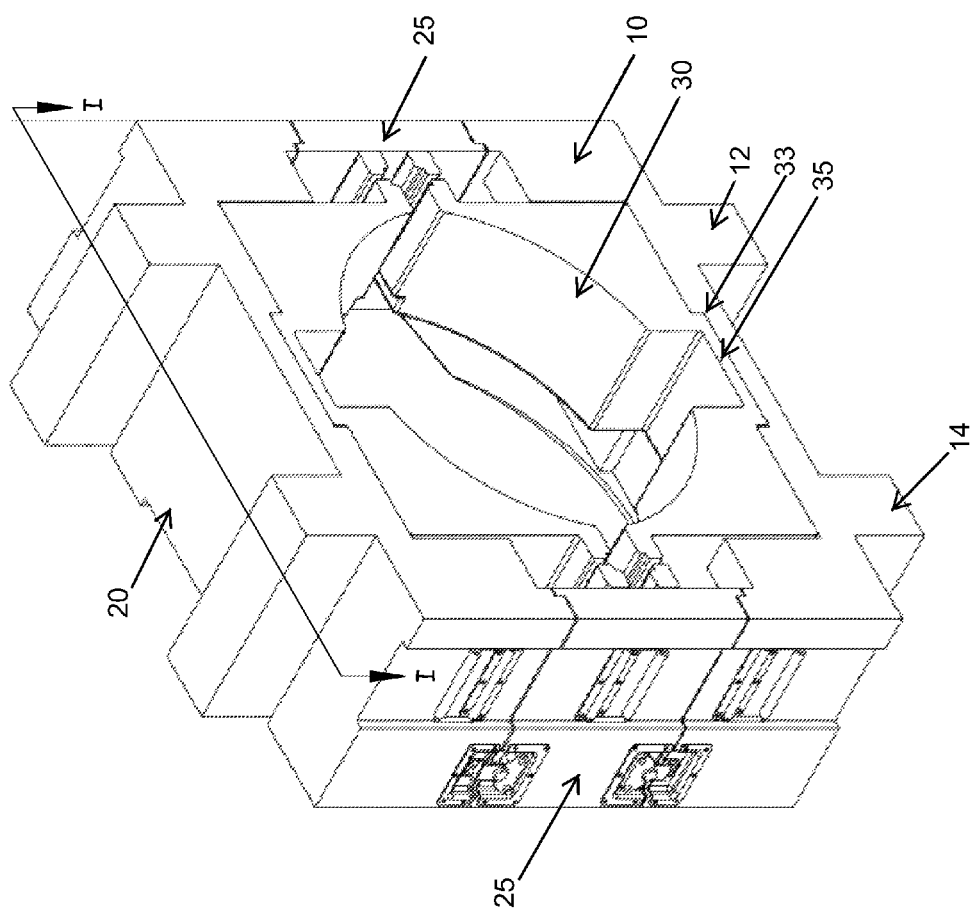
FIG. 2 shows a sectional view of the exemplary embodiment along line

FIG. 2 shows a sectional view of the exemplary embodiment along line I-I. A cradle member 30, depicted in the exemplary embodiment shown as a semi-circular member, but certainly not limited to this shape, is set within the base portion 10. The cradle member 30 supports brake assembly 1, as best shown in FIGS. 5A-5D, in a horizontal fashion relative to the base portion 10. The base portion 10, in the exemplary embodiment shown in FIG. 2, is provided with an at least one slide channel 33. As shown in the figure, at least one slide channel 33 is located as a single channel within the side of the base portion 10 having foot members 12, 14, extending therefrom. However, it is understood that the at least one sliding channel 33 can be located on any of the walls of the base portion in any geometric configuration, to suit the container and the cargo.

The cradle member 30 is provided with a corresponding sliding portion 35 that fits within the at least one sliding channel 33. The sliding portion 35 is depicted on one side of the cradle member 30. The sliding portion 35 is not limited to this location and can be modified to fit the location of sliding channel 33 within the base portion 10. The sliding portion 35 may also be varied in number, size and shape to suit the desired movement within the at least one sliding channel 33.

The ability of cradle member 30 to slide within the container allows for easy adjustment to accommodate orientation of either of the base portions 10, 20 during brake assembly servicing relative to the brake assemblies and the axle. This also permits the adjustment of the position of cradle member 30 to accommodate variations in the size and geometry of brake assembly 1.

In the exemplary embodiment shown, the at least one slide channel 33 is oriented along an axis shared with the longitudinal axis of the aircraft brake assembly 1. The at least one sliding channel 33, in this orientation, prevents lateral movement of the cradle, but allows for transverse movement of the cradle 30 within the at least one sliding channel 33. Further exemplary embodiments may provide for variations in the geometry of the at least one sliding channel 33 to provide for both transverse and lateral movement or lateral movement of the cradle 30 with respect to the shared longitudinal axis of the aircraft brake assembly. Again, this facilitates entry of the axle and the orientation of the brake container during servicing.

As described previously, the second base portion 20 is provided. The two base portions 10, 20 fitting together to form the transport container, as seen in FIG. 1. Within the second base portion 20 a further cradle member 30 is provided. Similar to the cradle member 30 and first base portion 10, an at least one sliding channel 33 and a sliding portion 35 are provided and the cradle member 30 is both movable within and removable from the second base portion 20 to accommodate the aircraft brake assembly 1.

Similarly, in either container portion 10, 20, adjustments after removal from the spacing container portion 25 can be made to accommodate changes in shape and configurations for removal of the used brake assembly 7, as show in FIGS. 5A-5D below. Similarly, once the used brake assembly 7 is removed from the aircraft axle and the new brake assembly 1 is installed, further adjustments in the configuration of the at least one cradle member 30 in the slide channel 33 can be made in preparation for storage and/or transport of the used brake assembly 7. Additional elements, such as supports and fixtures for specific loads may be added and placed in the existing slide channel 33. These would allow for changes in brake configurations that are asymmetrical or require special fixtures to contain, adding further flexibility to the invention.

FIGS. 3A1 and 3A2 show an isometric view of a base portion attached to the spacing member and detached, respectively, in an exemplary embodiment of the instant invention. The base portion 10 is shown with spacing container portion 25 still attached thereto, but with base portion 20 removed therefrom. Cradle member 30, depicted in the exemplary embodiment shown above, is set within the base portion 10 but not viewable in this instance. The cradle member 30 supports brake assembly 1, as best shown in FIGS. 5A-5D, in a horizontal fashion relative to the base portion 10. The removal of the spacing container portion 25 facilitates the final step in preparing the container for its installation mode. That is the base section 10 or 20 without the spacing container portion 25 and having the new brake assembly 1 container therein and ready for installation.

Figure 3B:
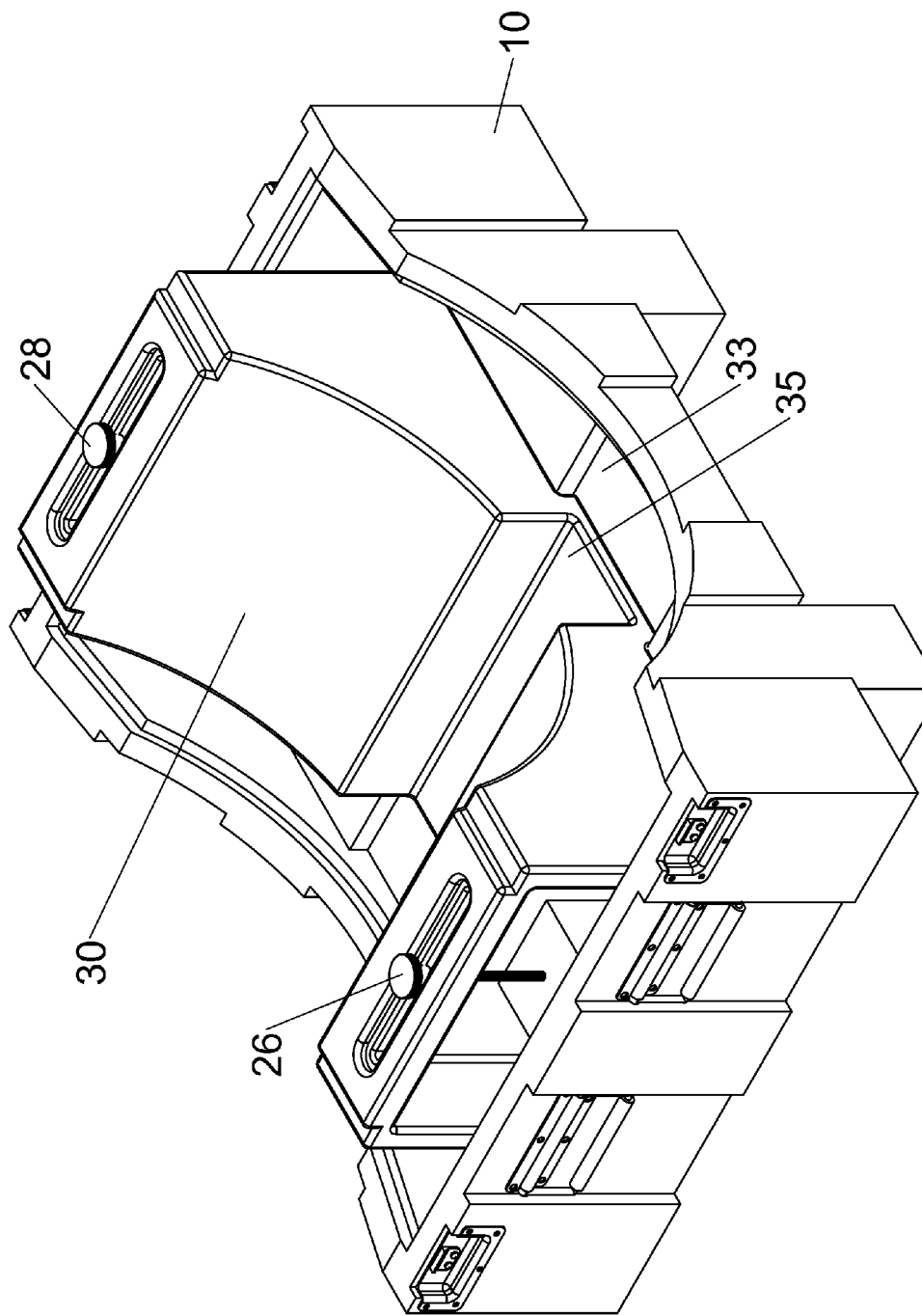
FIG. 3B shows an isometric view of a base portion without the spacing member of the exemplary embodiment but showing a cradle member.

FIG. 3B shows an isometric view of a base portion of the exemplary embodiment with cradle member. Cradle member 30, in the exemplary embodiment shown, is made to be removable, thereby allowing changes in the field of the shape and configuration of the cradle member 30 to fit any variations in the shape of the new or used aircraft brake assembly 1,7 to be transported. The cradle member 30 can be releasably secured within the base portion by any appropriate releasably securing mechanism or method, here shown as but certainly not limited to a threaded bolt with a knob or a threaded knob-handled bolt 26, 28, reliably threaded into an insert which is integral to base 10.

Figure 4:
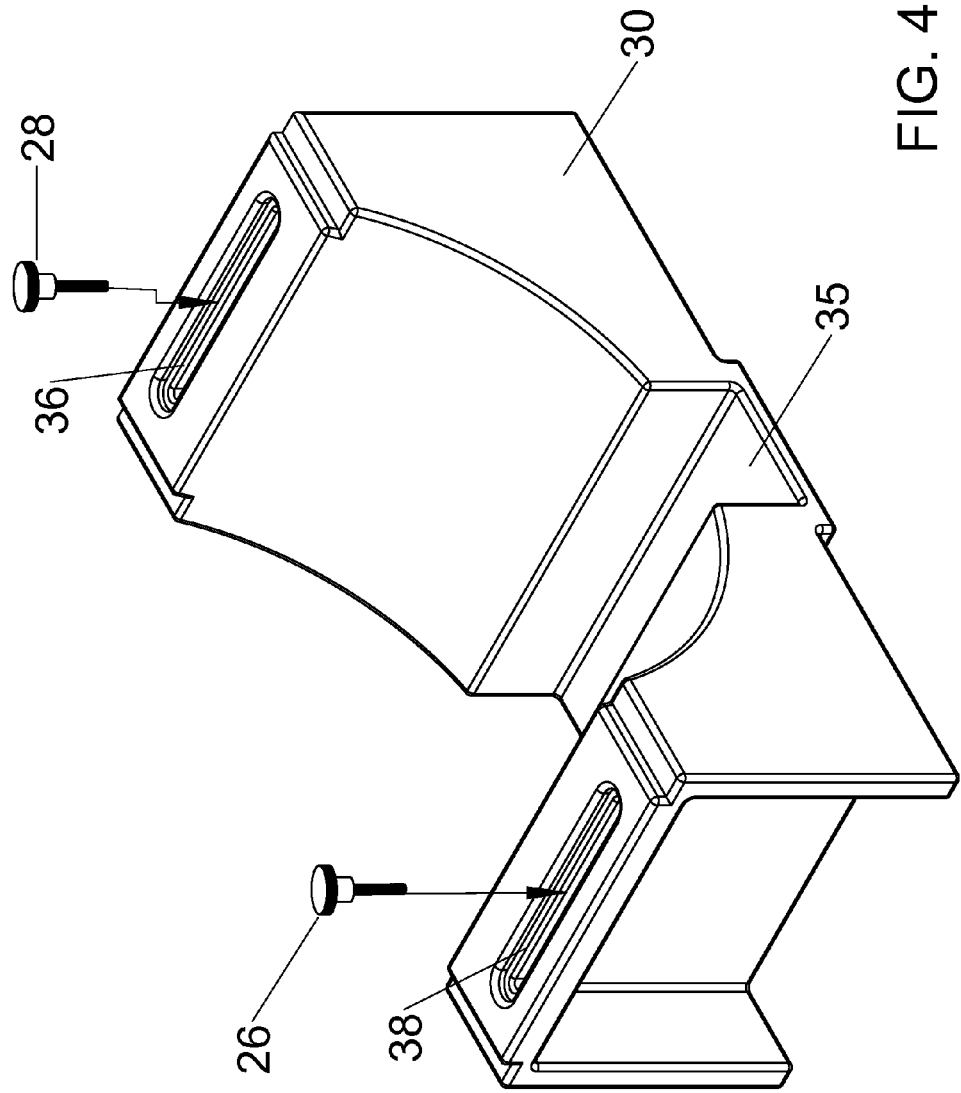
FIG. 4 shows an isometric view of a cradle member of the exemplary embodiment.

FIG. 3C shows an isometric view of a base portion of the exemplary embodiment without cradle member and FIG. 4 shows an isometric view of a cradle member of the exemplary embodiment. In the exemplary embodiment shown, the cradle member 30 is releasably secured the threaded knob-handled bolts 26, 28 which are releasably threaded into receptacles 27, 29 in columnar inserts, in the non-limiting example of the exemplary embodiment, and integral to base 10. The knob-handled bolts 26, 28 are engaged within slots 36, 38 in the cradle member 30, as more clearly shown in FIGS. 3B and 4. The knob handled bolts 26, 28 allow for easy adjustment of the position of cradle member 30 within the at least one sliding channel 33 to accommodate variations in the geometry of aircraft brake assembly I. Additionally, the bolts 26, 28 may be removed and the cradle member 30 may be replaced by differently sized and shaped members to accommodate an even wider range of geometric configurations of aircraft brake assemblies, as indicated by FIG. 3B. As noted above also with respect to FIG. 2, the cradle members may be adjusted, moved, removed and reinstalled, or similarly switched to accommodate the specific assembly. For instance, the base member shown in FIG. 3C may be base member 20 and the components may be moved prior to uninstalling the used brake assembly 7.

FIGS. 5A-5E are isometric views of the exemplary embodiment of the invention as deployed during maintenance operations. The brake container is brought by ground support equipment, such as by a brake dolly, to the aircraft brake undercarriage. In the exemplary embodiment shown, a brake dolly 175 which has a vertical lifting capability is typically used and is shown with respect to the embodiment shown in FIGS. 5A-5E. Variations in the size, shape, and number of brake dollies are contemplated and the use of similar devices is within the spirit of the invention.

The brake container is first prepared for removal of the used brake assembly 7. The second base portion 20 is removed from the spacing container portion 25. The spacing container portion 25 is then also removed from the first base portion 10 and is set aside. The new brake assembly 1 rests in a first of the at least one cradle members 30, here within a first base portion 10. The second base portion 20 having been removed is then rotated 180 degrees about its horizontal axis, so that its feet 16, 18 are oriented in the same direction as those of first base portion 10, as shown. Brake dolly 175 is used to maneuver the second base portion 20 into position. The empty or second base portion 20 is aligned with the axle the used aircraft brake assembly 7 while on the brake dolly 175. The second base portion 20 allows the axle of the undercarriage mounting the used brake assembly 7 to penetrate the container through the at least one void portion 100 in a side of the base portion 20. Thus, the base portion 20 can be more conveniently located directly under the used break assembly 7 and aircraft undercarriage 3. The position of the cradle member 30 can be adjusted to accommodate the used brake assembly as necessary. The brake dolly 175 is raised to bring the empty base portion 20 into contact with the used brake assembly 7. The cutout or void portion 100 accommodates the axle of the aircraft. The used aircraft brake assembly 7 is released from the aircraft undercarriage. The used brake assembly 7 is then slid into the cradle member 30 in the second container portion 20. This allows the released used brake assembly 3 to be easily slid into the second base portion 20 and lowered in an efficient manner with a minimum risk of injury.

The new aircraft brake assembly 1 is then installed. The first base portion 10 is positioned, either by moving the brake dolly 175 or sliding the container on the brake dolly 175 or its equivalent, so that the axle is positioned to the base portion 10 through the void portion 100. The base portion is slid with the new aircraft brake assembly 1, being cradled by cradle member 30, onto the axle. The new aircraft brake assembly 1 is fastened onto the axle. The first container portion 10 is then removed.

Figure 5D:
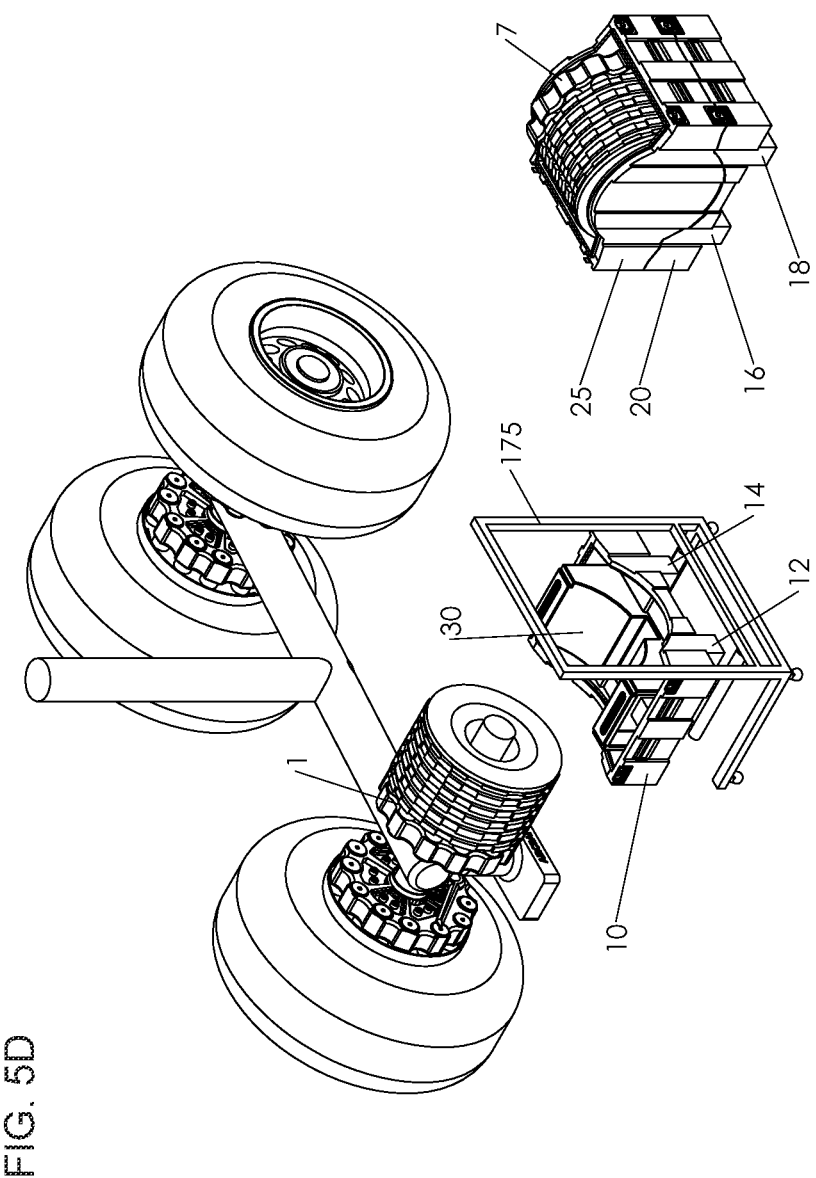

FIG. 5D and FIG. 5E show the removal of the used brake assembly and reassembly of the container. In this instance, the brake dolly 175 is lowered with the now empty first base portion 10. Alternatively, the brake dolly 175 can be lowered with the first portion 10 and the second portion 20 thereon or a similar method for removal can be utilized. The spacing container portion 25 is then recovered and fastened via one of the at least two fastening devices or securement devices 50 to the second base portion 20 or the first base portion 10, here shown as the second base portion 20 through the spacing portion or third container portion 25. The empty base portion 10 with cradle member 30 is rotated 180 degrees, the cradle member 30 being adjusted to accommodate the used aircraft brake assembly 7 in second base portion 20. Base portion 10 is then affixed atop the spacing container portion 25 and thereby to base portion 20 and the container is closed and prepared for shipment for disposal or refurbishment of the used brake assembly 7.

Figure 6:
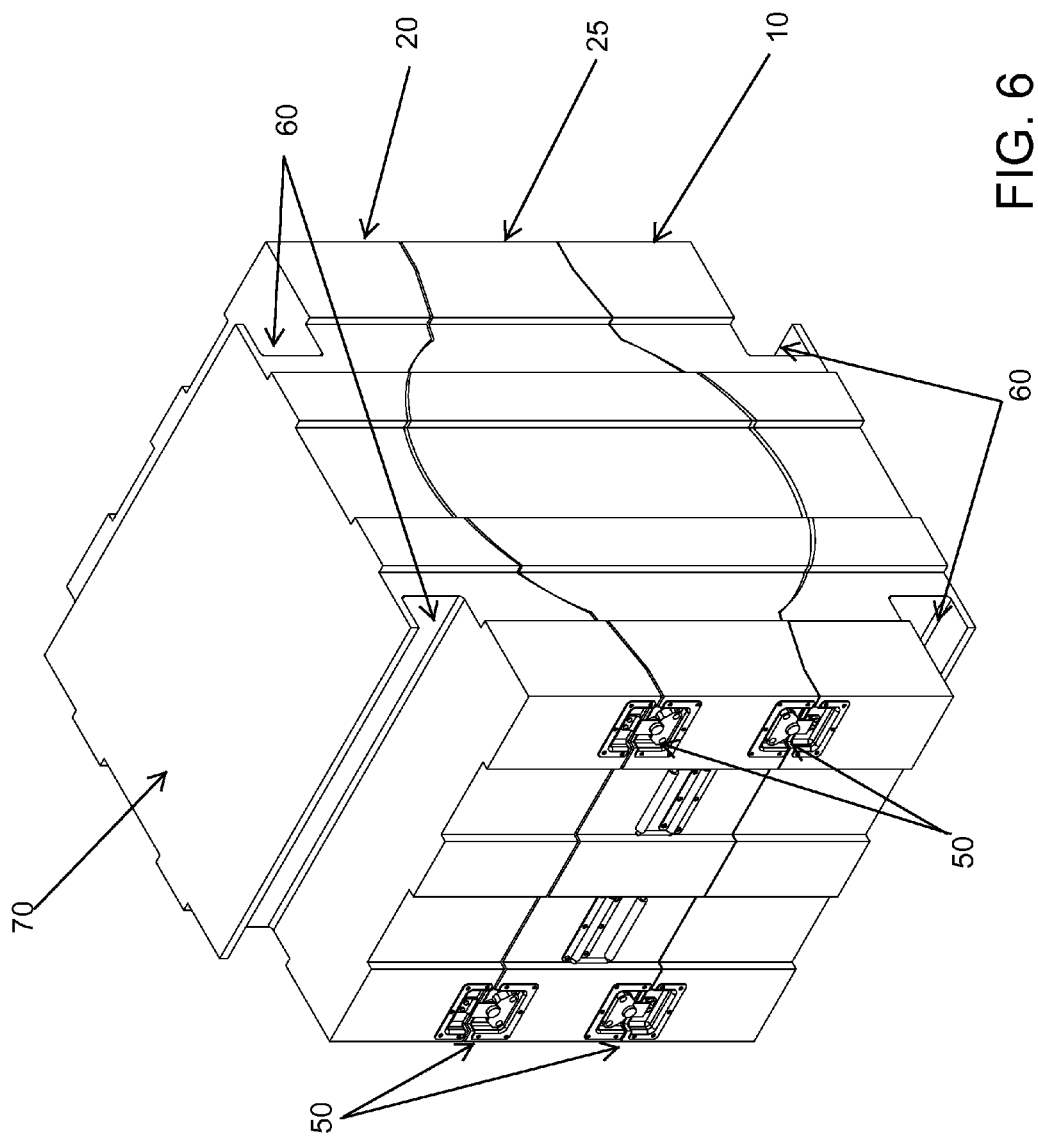
FIG. 6 shows a further isometric view of a further exemplary embodiment having load spreading extensions with lifting device cavities.
Figure 7:
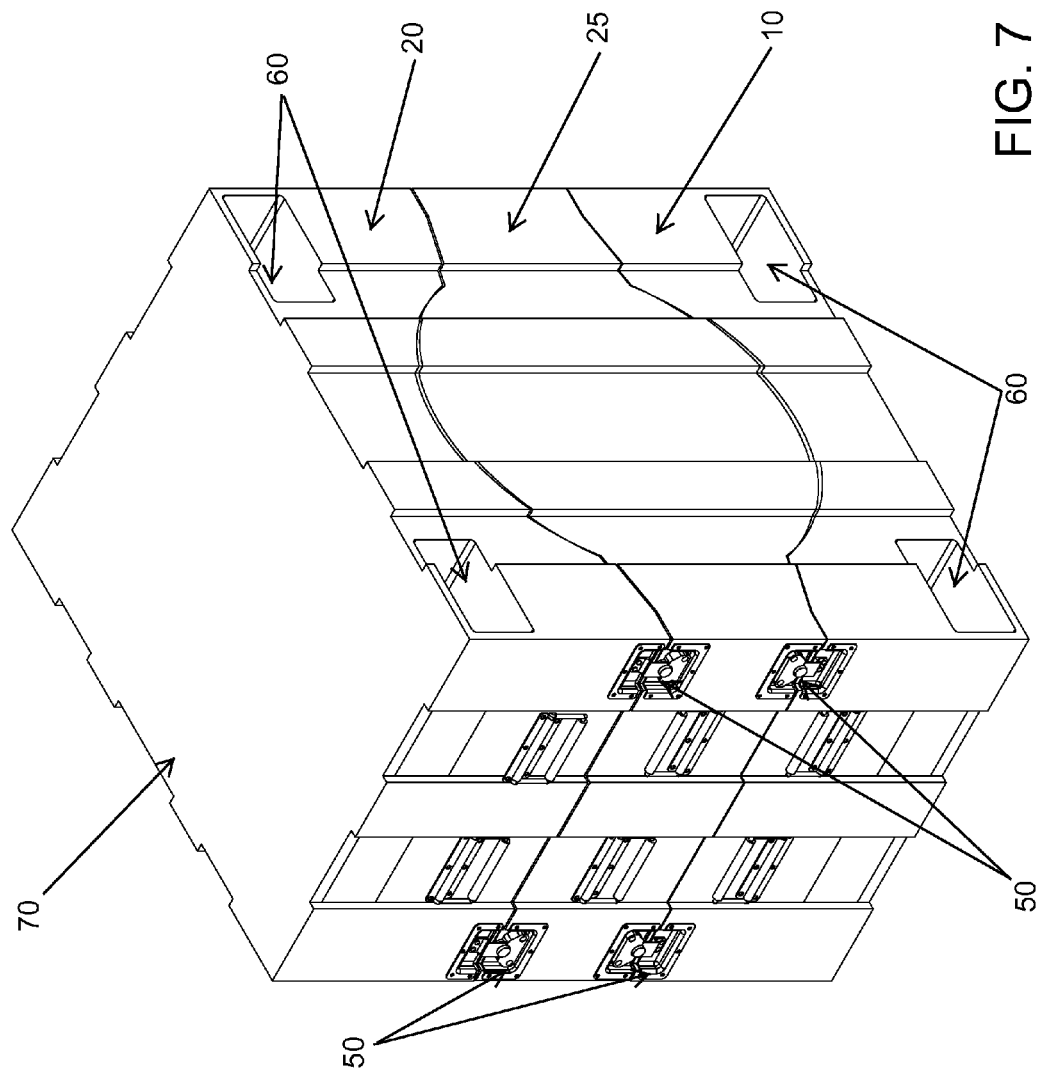
FIG. 7 shows a still further isometric view of a further exemplary embodiment having load spreading extensions with lifting device cavities.

FIGS. 6 and 7 show further isometric views of further exemplary embodiments having load spreading extensions with lifting device cavities. As seen in FIG. 6, the at least three piece container is substantially the same, having a first base portion or first of an at least three container portions 10 coupled to a coupling or spacing or third of an at least three container portions 25, which in turn is coupled to a second base portion or second of an at least three container portions 20. Securement devices 50 couple the container portions together.

A load spreading protrusion 70 is provided with cavities 60 for access by a lifting device, such as a hand operated lift, forklift, or the like. The load spreading protrusion 70 extends from the top and bottom of the container from the first and second container portions 10, 20. The load spreading protrusion 70 provides for a greater surface area and thereby greater distribution of the weight of the loaded container during storage and transport. As noted, the size of the brake assemblies continues to grow, thus the weight has increased and these modifications to the exemplary embodiment accommodate these greater weights.

The embodiment of FIG. 7 shows a similar embodiment with a similar load spreading protrusion 70 extending from the top and bottom of the container portions 10, 20. In this instance the protrusion extends through the entire length of the top and bottom of the container, or the entire length of the first and second container potions 10, 20 to provide maximum surface area for weight distribution and reduction of the point load.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. An aircraft brake assembly container, comprising:

a first container portion of an at least three container portions having an at least one channel therein and releasably securing an at least one cradle member therein with an at least one portion extending from the at least one cradle member to engage and move within said at least one channel and having an at least one void section;

a second container portion having an at least one channel therein and releasably securing an at least one cradle member therein with an at least one portion extending from the at least one cradle member to engage and move within said at least one channel and with an at least one void section such that said second container portion is identical to said first container portion, said first and second container portions of an at least three container portions fittingly engaging with a third container portion of an at least three container portions, said third container portion of an at least three container portions coupling to each of the first and second container portions and filling the void section in each portion with a corresponding tab portion extending from both a top and a bottom of the third container portion into the identical first and second container portions and said second of an at least three container portions is stacked atop said third container portion which is stacked atop said first of the at least three container portions to form said aircraft brake assembly container;

an at least one securement device for securing said first portion and second portion to said third portion, wherein the at least one cradle member in each of the first and second of the at least three container portions is moved along the respective at least one channel in the respective container portion such that an aircraft brake assembly is cradled thereon wherein the aircraft brake assembly is supported when in the container in a horizontal orientation relative to the container, and wherein the at least one void portion provided on said first or second of the at least three container portions allows an aircraft undercarriage or brake axle to penetrate the container and couple to the aircraft brake assembly when the third of the at least three container portions is removed.

2. The aircraft brake assembly container of claim 1, wherein the at least one cradle member is releasably secured within said container portions.

3. The aircraft brake assembly container of claim 2, wherein the at least one cradle member is releasably secured through an at least one post having an at least one bolt bolted within a threaded cutout in the at least one cradle member.

4. The aircraft brake assembly container of claim 1, wherein the at least one securement device is an at least one hinge, latch, knob, bolt, bolt with knob, screw pin, pushpin, or pin.

5. The aircraft brake assembly container of claim 1, wherein the at least one channel is a single channel in each of the portions.

6. The aircraft brake assembly container of claim 1, wherein the at least one channel is multiple channels.

7. The aircraft brake assembly container of claim 1, wherein the at least one cradle member is multiple cradle members.

8. The aircraft brake assembly container of claim 1, wherein the at least cradle member is generally semi-circular.

* * * * *